United States Patent
Berezhanskyi

(10) Patent No.: US 12,403,566 B1
(45) Date of Patent: Sep. 2, 2025

(54) SYSTEM AND METHOD FOR GRIPPING AND CENTERING WORKPIECES FOR SUBSEQUENT PROCESSING

(71) Applicant: Automated Industrial Machinery, Inc., Tampa, FL (US)

(72) Inventor: Volodymyr Berezhanskyi, Palm Harbor, FL (US)

(73) Assignee: Automated Industrial Machinery, Inc., Tampa, FL (US)

( * ) Notice: Subject to any disclaimer, the term of this patent is extended or adjusted under 35 U.S.C. 154(b) by 0 days.

(21) Appl. No.: 19/206,672

(22) Filed: May 13, 2025

(51) Int. Cl.
*B25B 5/08* (2006.01)
*B25B 5/14* (2006.01)
*F16B 2/18* (2006.01)

(52) U.S. Cl.
CPC .................. *B25B 5/08* (2013.01); *B25B 5/14* (2013.01); *F16B 2/18* (2013.01)

(58) Field of Classification Search
CPC ..... B25B 5/00; B25B 5/14; B25B 5/08; F16B 2/18
See application file for complete search history.

(56) References Cited

U.S. PATENT DOCUMENTS

| | | | | |
|---|---|---|---|---|
| 4,623,191 A * | 11/1986 | Blume | ................... | B62D 17/00 192/93 R |
| 9,010,219 B2 * | 4/2015 | Feigel, Jr. | ............. | E21B 19/164 81/57.18 |
| 10,173,304 B2 * | 1/2019 | Christofilis | .............. | B21D 7/16 |
| 2005/0011312 A1 * | 1/2005 | Mardian | ............... | E21B 19/164 81/57.18 |
| 2014/0345426 A1 * | 11/2014 | Rosano | ................ | E21B 19/161 81/57.18 |

* cited by examiner

*Primary Examiner* — Lee D Wilson
(74) *Attorney, Agent, or Firm* — Nicholas Pfeifer; Smith & Hopen, P. A.

(57) ABSTRACT

A clamping device for gripping and centering a workpiece includes an internal housing with a radial cutout and a pair of slider slots. An outer collar is rotatably mounted around the internal housing and includes a radial cutout and an internal actuation track. Sliders are positioned in the slider slots and engage the actuation track, such that rotation of the collar causes axial translation of the sliders. Each slider is operably coupled to a clamping jaw and axial movement of the sliders causes radial displacement of the jaws, enabling gripping of the workpiece within the radial cutout. In some embodiments, the engagement between the sliders and collar is self-locking. The device may also include adjusting screws for fine positioning of the jaws. The structure allows for compact, high-force gripping, precise centering, and lateral workpiece insertion in bending or forming applications involving rods, wires, or tubes.

18 Claims, 14 Drawing Sheets

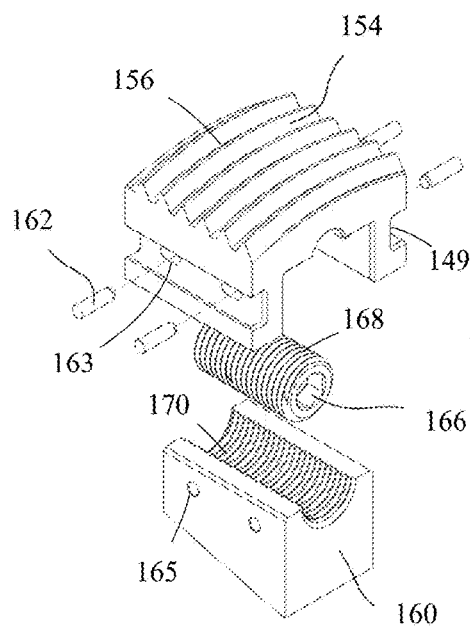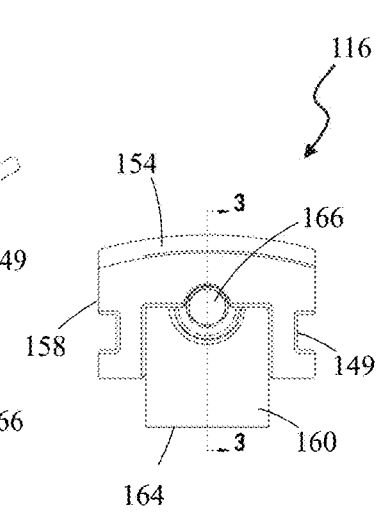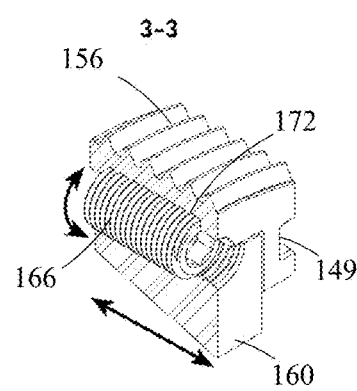
Fig. 11　　　　　Fig. 12　　　　　Fig. 13
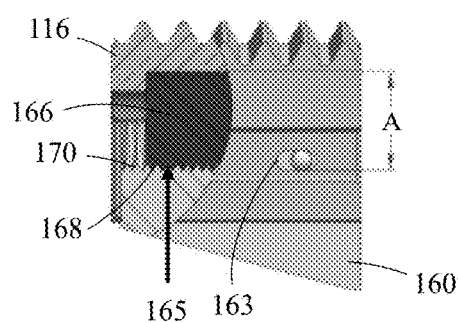
Fig. 14

SYSTEM AND METHOD FOR GRIPPING AND CENTERING WORKPIECES FOR SUBSEQUENT PROCESSING

FIELD OF THE INVENTION

The present invention relates generally to systems and methods for gripping, centering, and securing workpieces. More particularly, the present invention pertains to systems and methods for gripping, centering, and securing wires, tubes, or rods for bending operations.

BACKGROUND

In manufacturing environments that involve forming or bending wire, tube, and rod stock into precise geometries, the ability to consistently center and secure a workpiece is critical to achieving repeatable accuracy and product quality. This challenge becomes significantly more complex when working with long, slender workpieces whose lengths greatly exceed the cross-sectional dimensions, resulting in low inherent rigidity and a high susceptibility to deflection and misalignment.

Conventional clamping devices, such as lathe chucks or drill vises, are typically too bulky or mechanically limited to be used in bending systems that require both compact design and full 360-degree rotational access. These traditional devices often lack the precision centering capability needed for non-round or asymmetrical profiles, and cannot maintain high clamping force without sacrificing centering accuracy.

Existing solutions have attempted to address these issues by independently actuating each clamping jaw. While this can offer adjustable centering, it introduces additional complexity, requiring precise multi-axis control systems, higher part tolerances, and additional actuators-all of which increase cost, reduce reliability, and add maintenance burden. Furthermore, such systems are rarely compact enough to be integrated near the midpoint of long workpieces, where support is most needed to reduce deformation during forming operations.

Another limitation of existing clamping technologies is the lack of a built-in extraction path for finished parts. In applications where the formed product significantly exceeds the dimensions of the clamping head, the inability to eject the part laterally (i.e., perpendicular to the workpiece's longitudinal axis 109) introduces inefficiencies and restricts automation.

One example of a known centering and clamping device is disclosed in U.S. Pat. No. 10,173,304, which describes a centering chuck system utilizing radially movable clamping jaws driven by a rotating slots about a pin location. Systems such as the one disclosed in the '304 patent provide useful solutions for centering workpieces in some environments; however, they present notable limitations. Specifically, conventional systems often require relatively high actuation forces to achieve sufficient clamping pressure, lack inherent self-locking capability once clamping force is applied, offer limited options for in-situ workpiece alignment adjustment, and are vulnerable to failure or performance degradation due to wear debris and contamination within sliding mechanisms.

The present invention addresses these and other shortcomings of prior systems through a unique actuation mechanism that offers substantial technical advantages not disclosed or rendered obvious by known devices. Among the key improvements, the clamping device of the present invention provides an extremely high mechanical advantage (transmission ratio) in applying clamping force, enabling secure and efficient gripping of the workpiece with minimal input force. The mechanism inherently exhibits self-locking behavior once clamped, meaning that the clamped state is maintained even after the actuation force is removed, thereby enhancing safety and reliability during processing.

Furthermore, the present invention allows precise adjustment of the workpiece's centered position without requiring disassembly of the device or replacement of components, offering significantly greater control and operational flexibility. Unlike conventional systems, where sliding friction surfaces are critical and prone to failure from accumulated wear debris, the construction of the present invention is highly resistant to contamination and mechanical wear. As a result, the device maintains consistent performance and reliability even in demanding industrial environments.

These differences are not merely structural but instead represent a fundamentally different operational principle and user interaction model, leading to significantly improved industrial performance, safety, and longevity compared to prior art devices.

However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved centering and clamping device and method of use is now met by a new, useful, and nonobvious invention.

The present invention is directed to a device for gripping and centering a workpiece. The device includes an internal housing having a radial cutout configured to receive the workpiece and a slider slot. An outer collar is rotatably mounted around the internal housing and includes a radial cutout that aligns with the radial cutout in the housing. A slider is positioned within the slider slot and is configured to engage an actuation track on the inner surface of the outer collar. As the outer collar is rotated relative to the housing, the slider translates axially. The slider is operably coupled to a clamping jaw movably positioned in a clamping slot in the housing. The clamping jaw includes a workpiece-engaging surface at a first end and a force-receiving surface at a second end. Axial translation of the slider in a first direction causes radial displacement of the clamping jaw toward the workpiece, thereby gripping and centering the workpiece within the housing.

In some embodiments, the actuation track is helical, and the engagement between the slider and the collar provides a self-locking interface that resists reverse rotation due to external forces acting on the jaws. In addition, the internal housing may include guides that constrain the slider to move along a linear axis. In some embodiments, the slider includes an adjusting screw threadedly engaged with a force-transferring element, allowing for fine adjustments to the radial position of the clamping jaw. The device may also include a spring biasing the clamping jaw towards the slider to assist to ensure that the jaw remains in operable engagement with the slider.

In some embodiments, the outer collar may include external gear teeth to receive rotational input from a drive gear. In addition, an outer gear may be secured to the internal housing to control or stabilize housing rotation during operation.

In another embodiment, the device includes a pair of diametrically opposed slider slots in the housing and a corresponding pair of sliders positioned therein. The outer collar includes a helical actuation track, and each slider includes an engagement element that engages the track. Rotation of the outer collar causes the sliders to translate axially. Each slider is operably coupled to a corresponding clamping jaw positioned in a clamping slot. The axial movement of the sliders displaces the jaws radially toward each other to grip the workpiece centered within the radial cutout.

Some embodiments include thread-like or gear-like engagement features between the sliders and collar that form a non-backdrivable interface. Each clamping jaw includes an engagement surface for interfacing with workpieces and may include a return spring. The device may include adjusting screws in each slider, which allow independent fine-tuning of the jaw positions. These features enable precise centering of asymmetric or worn components, improve holding stability, and allow for use in high-torque bending operations without risk of misalignment.

In another aspect, the invention includes a method of gripping and centering a workpiece using the disclosed clamping device. The method includes inserting the workpiece laterally into a radial cutout defined in an internal housing of the device. An outer collar, rotatably mounted around the internal housing, is rotated. The outer collar includes an inner helical actuation track engaged with a pair of diametrically opposed sliders housed within the internal housing. As the outer collar rotates, the helical engagement causes axial translation of the sliders. This axial movement results in radial displacement of a corresponding pair of clamping jaws positioned within the housing, causing the jaws to grip and center the workpiece within the radial cutout.

In some embodiments, the actuation track and engagement elements form a self-locking interface that resists reverse movement of the outer collar due to forces acting on the jaws. Some embodiments include rotating an adjusting screw disposed in a slider to axially reposition a force-transferring element coupled to a clamping jaw. The method may also include applying torque to an outer gear secured to the internal housing to control or stabilize its rotation during processing. In certain implementations, the method includes reversing the direction of rotation of the outer collar to retract the jaws and release the workpiece after processing.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 11 is an exploded view of an embodiment of a slider in accordance with some embodiments of the present invention.

FIG. 12 is a front elevation view of an embodiment of a slider in accordance with some embodiments of the present invention.

FIG. 13 is a cross-sectional view of the slider taken along line 3-3 in FIG. 12, showing internal components of a slider in accordance with some embodiments of the present invention.

FIG. 14 is a sectional view depicting the interface between the slider, adjusting screw, and force transferring element in accordance with some embodiments of the present invention.

DETAILED DESCRIPTION OF THE INVENTION

Figure 1:
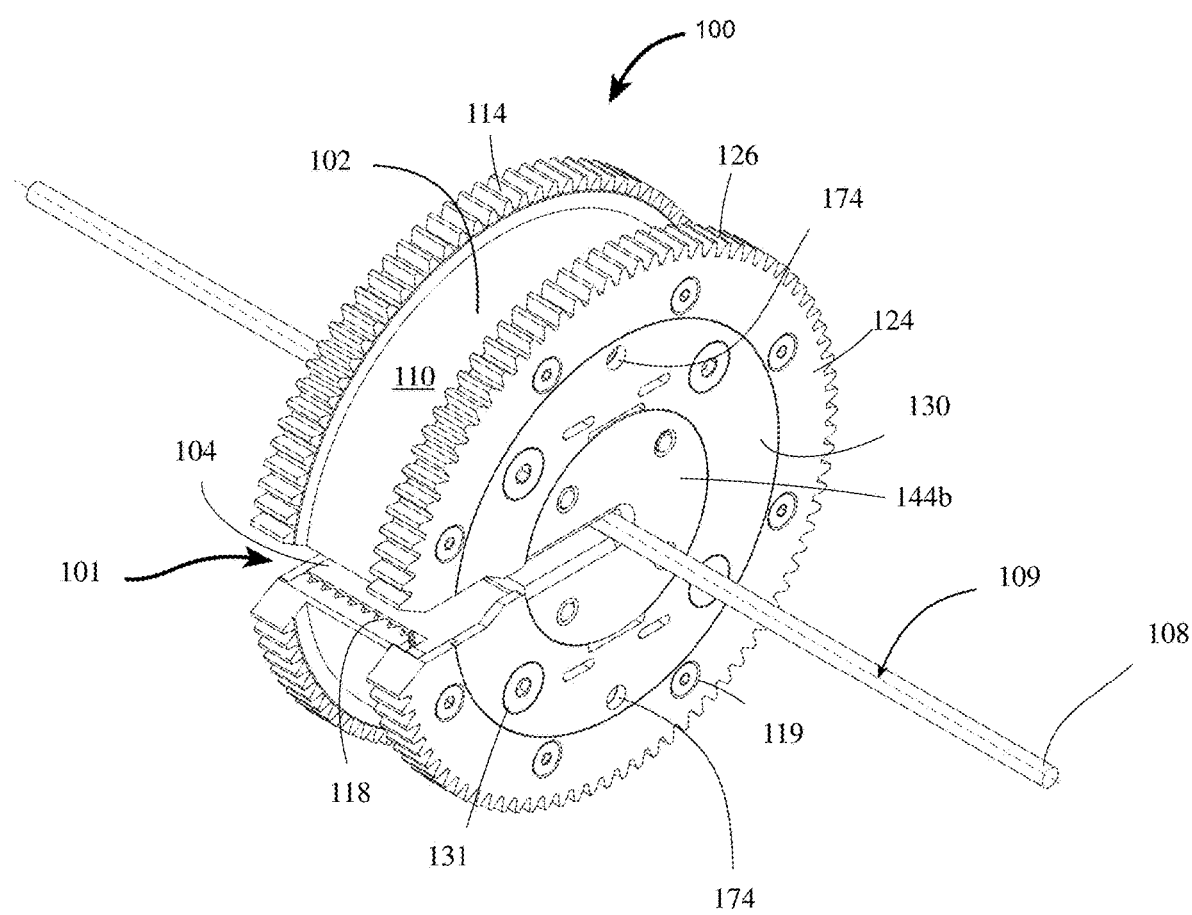
FIG. 1 is a perspective view of an embodiment of the present invention with a workpiece secured in the device.

In the following detailed description of the present invention, reference is made to the accompanying drawings, which form a part thereof, and within which are shown by way of illustration specific embodiments by which the invention may be practiced. Numerous specific details are set forth to provide a thorough description of the embodiments of the present invention. It will be apparent to one of ordinary skill in the art that some embodiments may be practiced without some of these specific details. It is to be understood that other embodiments may be utilized, and structural changes may be made without departing from the scope of the invention.

Referring in general to the following description and accompanying drawings, various embodiments of the present disclosure are illustrated to show its structure and method of operation. Common elements of the illustrated embodiments may be designated with similar reference numerals.

Figure 2:
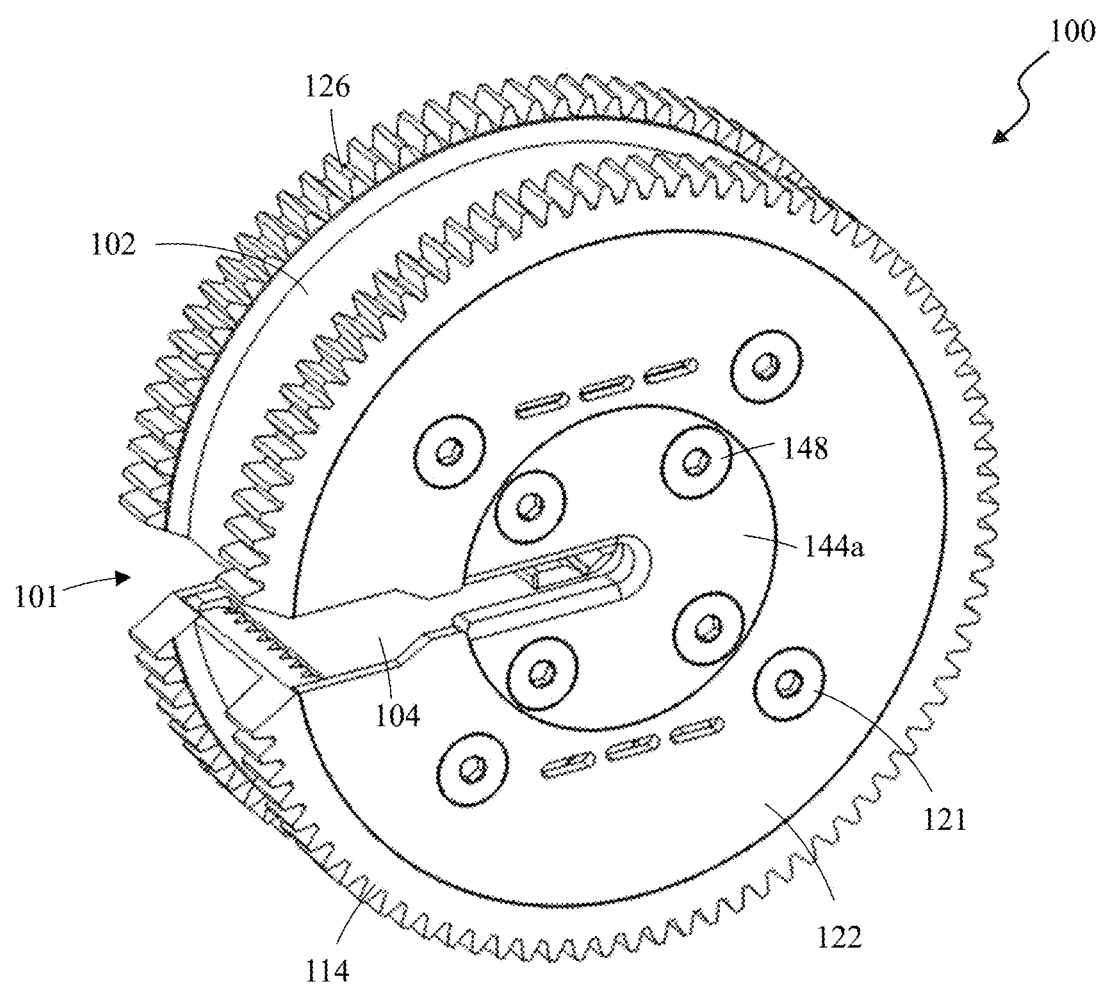
FIG. 2 is a perspective view of an embodiment of the present invention from a generally opposite side of the device in comparison to FIG. 1.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

All numerical designations, such as measurements, efficacies, physical characteristics, forces, and other designations, including ranges, are approximations which are varied up or down by increments of 1.0 or 0.1, as appropriate. It is to be understood, even if it is not always explicitly stated that all numerical designations are preceded by the term "approximately." As used herein, "approximately" refers to being within an acceptable error range for the particular value as determined by one of ordinary skill in the art, which will depend in part on how the value is measured or determined. When an acceptable range is not dictated by the one of ordinary skill in the art, "approximately" refers to ±15% of the numerical when used in connection with particular values; it should be understood that a numerical including an associated range with a lower boundary of greater than zero must be a non-zero numerical, and the term "approximately" should be understood to include only non-zero values in such scenarios.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The term "workpiece" refers to any elongated material or component of finite length that is subject to centering, clamping, and subsequent processing within the device. It is characterized by having a definable longitudinal axis and a cross-sectional profile that may vary in shape, including round, oval, rectangular, polygonal, or otherwise profiled geometries. The workpiece may be composed of any structurally compatible material suitable for bending, forming, or machining operations. Within the context of the clamping head device, the workpiece is positioned and held in a manner that allows controlled rotation about its longitudinal axis, enabling precision shaping or modification operations while maintaining alignment and geometric accuracy throughout the processing cycle.

The present invention includes a device and method for clamping a workpiece within systems and/or machines configured to bend forming wire, tubes, profiled rods, or other workpieces of finite length. The present invention is intended to effectively solve the above-mentioned problems encountered during the forming of wires, tubes, or profiled rods of finite length by bending methods. In addition, the device addresses the aforementioned issues while maintaining minimal dimensions within its class (the device thickness may be less than 1.25"). Furthermore, the design provides high clamping force, precision centering accuracy, the capability to adjust the position of the longitudinal axis of the workpiece without disassembling the device or replacing any parts of the device, and preserve all set parameters during rotation of the workpiece exceeding 360°.

Referring now to FIGS. 1-5, the centering clamping device of the present invention is generally represented by reference numeral 100. The device 100 includes a radial cutout 101 that forms a lateral passageway, allowing a workpiece 108 to be inserted into the device 100. The cutout 101 has a size and shape sufficient to accommodate a range of workpiece cross-sections. In some embodiments, the cutout 101 has an opening that is between approximately 0.04 inches and 0.53 inches, but it should be understood that the dimensions are dependent on the specific application and may vary significantly from the exemplary range above.

Device 100 also includes an outer collar 102, which serves as a primary rotational actuation component of the clamping system. The outer collar 102 is generally disc-shaped and is configured to encircle an internal housing 104.

The outer collar 102 includes an internal diameter sufficient to house the internal housing 104 and its components. In some embodiments, the internal diameter is between approximately 3.5 inches and 4.0 inches. The outer collar 102 has an axial width sufficient to allow for axial translation of one or more sliders 116 as will be explained in greater detail below. In some embodiments, the axial width is between approximately 1.22 inches and 1.75 inches. Again, it should be understood that the dimensions are dependent on the specific application and may vary significantly from the exemplary ranges.

The outer collar 102 also includes a radial cutout 106. The cutout 106 has a size and shape sufficient to accommodate a range of workpiece cross-sections.

Figure 22:
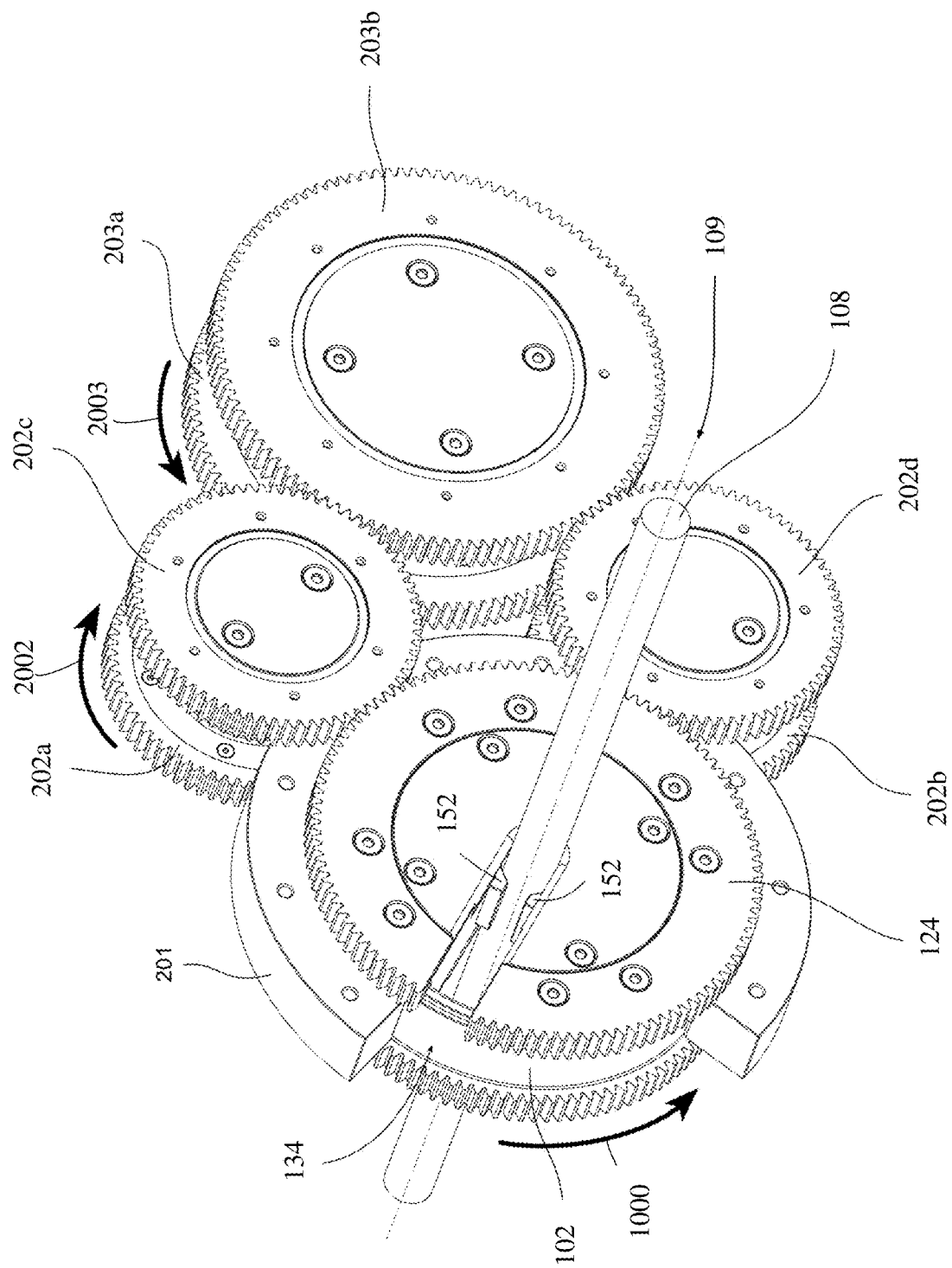
FIG. 22 is a perspective view of an embodiment of the present invention prior to processing a workpiece.
Figure 23:
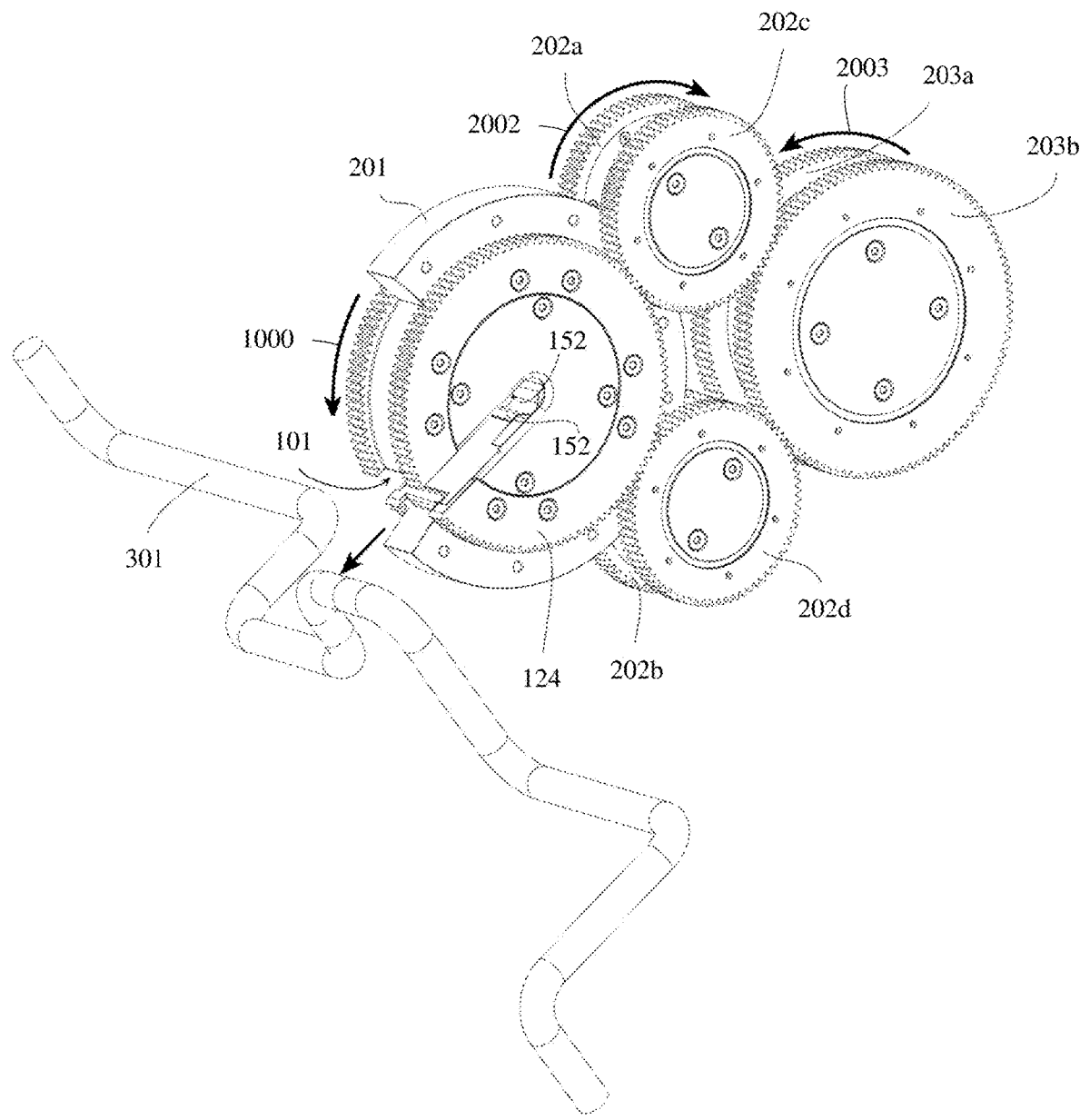
FIG. 23 is a perspective view of an embodiment of the present invention after processing a workpiece.

The outer surface 110 of the outer collar 102 includes gear teeth 114. These gear teeth 114 are oriented to mesh with external drive gears (e.g., gears 202a and 202b as depicted in FIGS. 22-23), allowing controlled rotation of the outer collar relative to the internal housing 104. In some embodiments, the gear teeth 114 are arranged circumferentially about the outer collar 102, however, alternative arrangements are considered. The teeth 114 may be involute, straight-cut, or of another known profile suitable for smooth torque transfer. In some embodiments, alternative gear styles or placements are used, provided they engage with the external actuation system to drive the rotation of collar 102.

The inner surface 112 of the outer collar 102 includes an internal actuation track 118, which is configured to engage the sliders 116. As the outer collar 102 rotates relative to the housing 104, the interaction converts rotational motion into controlled linear displacement of the sliders 116, which in turn drive the movement of the clamping components as will be explained in greater detail below.

Figure 6:
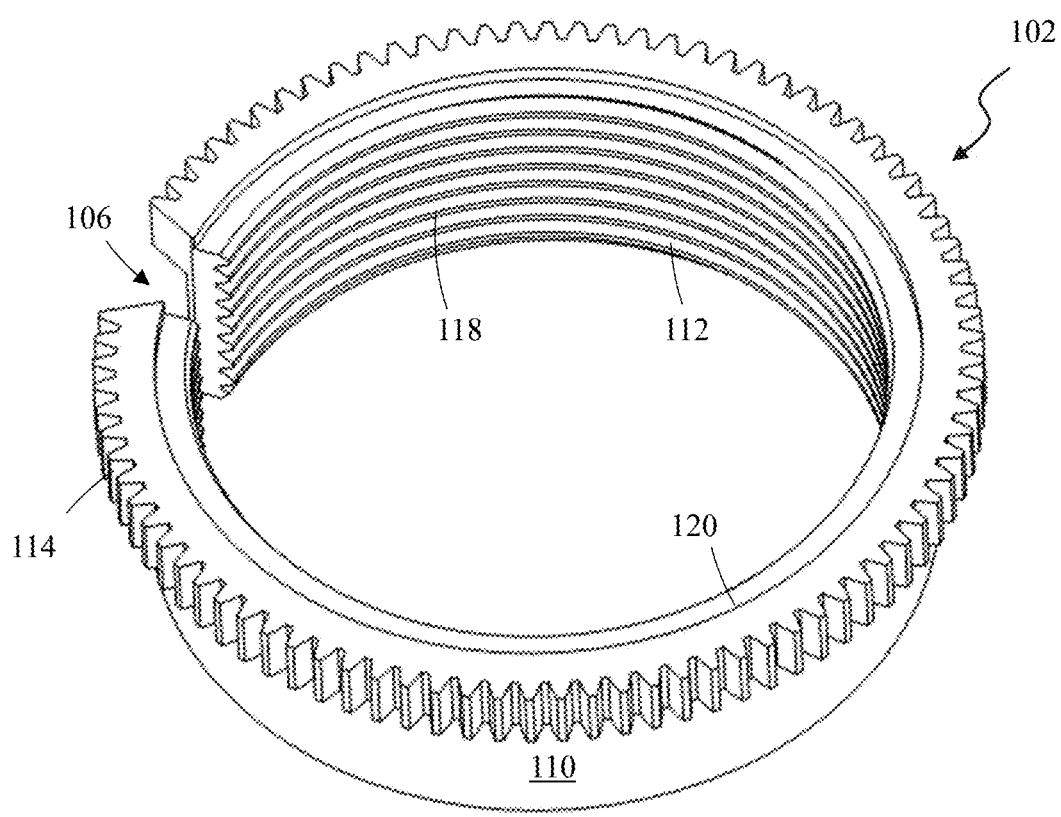
FIG. 6 is a perspective view of the outer collar in accordance with some embodiments of the present invention.

In some embodiments, as best depicted in FIG. 6, the actuation track 118 includes one or more helical guides or threads. The sliders 116 include a corresponding feature configured to engage the actuation track 118 and rotation of the outer collar 102 causes axial translation of the sliders as a result of the helical orientation of the guides or threads.

The engagement between the actuation track 118 on the outer collar 102 and the engagement element 156 on the slider 116 may be configured to self-lock using particular interfaces, such as a worm-gear-like interface. This can be achieved by shaping the helical track and engagement feature to have a low lead angle and high-friction surface interaction, such that the axial movement of the slider 116 is driven effectively by rotation of the outer collar 102, but external forces applied to the slider 116—such as those transmitted through the clamping jaw 152—do not cause the collar 102 to rotate in reverse. This configuration provides inherent self-locking behavior, preventing backlash and maintaining clamping force without requiring constant external torque input. Non-limiting alternatives for achieving self-locking behavior in the collar-slider interfaces may include worm gears, Acme threads, trapezoidal threads, thread profiles with lead angles below the friction angle, ratchet-and-pawl mechanisms, one-way friction clutches such as sprag or roller clutches, or other mechanisms configured to resist reverse motion under load.

Figure 7:
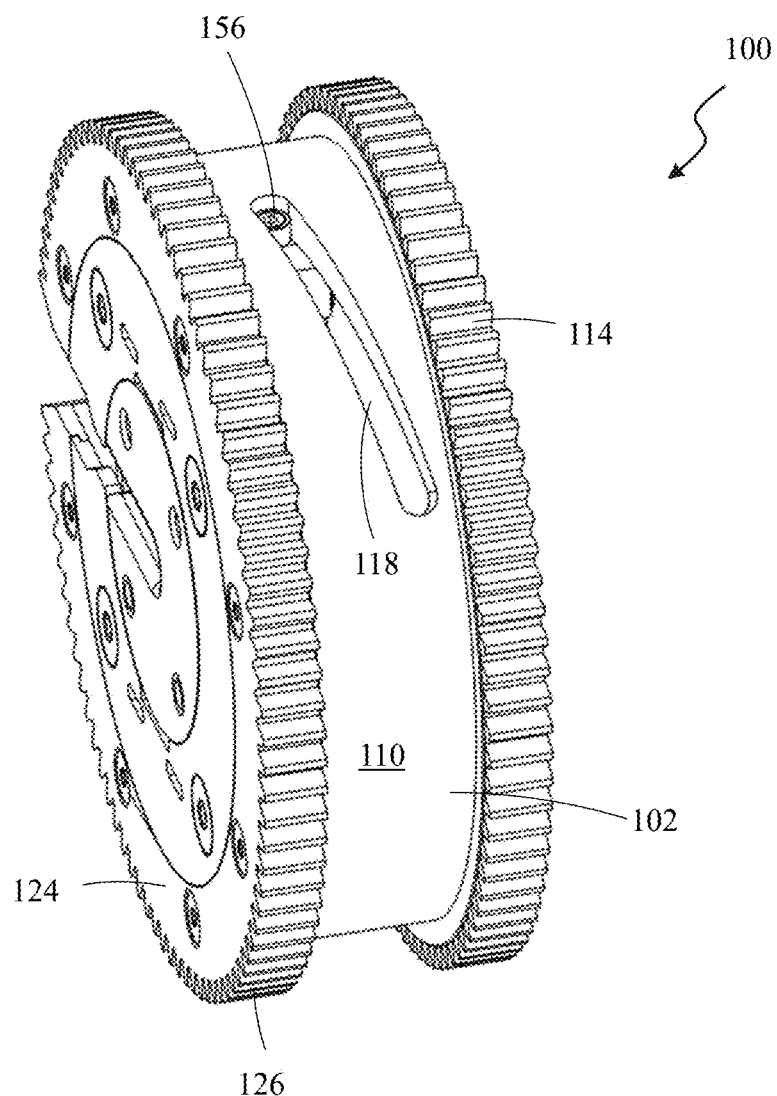
FIG. 7 is a perspective view of an embodiment of the present invention.

In other embodiments, as best depicted in FIG. 7, the internal actuation track 118 is in the form of a slot. The slot 118 may be linear or arcuate and has an orientation that is transverse to the rotational axis of the device 100. Put another way, the slot 118 extends in an orientation that is non-parallel to a radial plane of the device 100 and thus has at least one location that is closer to gear teeth 126 and another location that is closer to gear teeth 114.

The slot 118 thereby axially translates a projection 156 extending from a slider 116 disposed within the slot 118 when the outer collar 102 rotates relative to the internal housing 104. The slot 118 may be arcuate, spiral, or multipath, with one or more sections positioned closer to gear teeth 114 and others farther, thereby generating the axial displacement. In some variants, the track 118 includes a continuous groove, while in others it comprises discrete pockets or ramps. Regardless of the form of the internal actuation track 118, the interaction with the sliders 116 converts rotational input into a linear output, which is used to clamp the workpiece 108.

As best depicted in FIG. 6, the outer collar 102 may also include an internal lateral receiving feature 120, such as a shoulder, groove, or recessed surface. Receiving feature 120 is configured to receive and axially position a side cover 122 (see e.g., FIGS. 2-3). This feature extends along an internal radial surface of the outer collar and is dimensioned to accommodate at least a portion of the side cover 122. The side cover 122 is configured to be secured to the internal housing 104 using for example fasteners 121 or any other devices or methods for connecting the side cover 122, including but not limited to screws, bolts, threaded inserts, captive screws, snap-fit tabs, quarter-turn fasteners, cam lock fasteners, magnetic fasteners, or rivets. When the side cover 122 is secured to the internal housing 104, the interconnection of the side cover 122 and the receiving feature 120 ensures proper axial alignment and retention of the outer collar 102 relative to internal housing 104. The side cover 122 is also intended to protect the internal components of device 100.

It should be noted that while the receiving feature 120 is circular in shape, alternative shapes are considered so long as the shape corresponds to the shape of the side cover 122 and aid in the relative alignment of the outer collar 102 and the internal housing 104. In addition, the side cover 122 includes a radial cutout 123 that is similarly sized to the cutout 106.

As depicted in FIGS. 1-5, device 100 may further include outer gear 124 with gear teeth 126. The outer gear 124 is secured to the internal housing 104 such that the two conjointly rotate. In some embodiments, the outer gear 124 is secured to the internal housing 104 using one or more fasteners 119. A multitude of fasteners 119 may be equidistantly arranged about the rotational axis of the device 100.

The outer gear 124 also includes a radial cutout 125 similar to cutout 106. Likewise, cutout 125 has a size and shape sufficient for receiving workpiece 108. Cutout 125 further establishes the passageway for feeding a workpiece 108 into the internal housing 104 of the device 100.

As depicted, the outer gear 124 includes circumferential gear teeth 126 and functions as a rotational transmission element to apply a holding torque or a counter torque during operation. Gear teeth 126 are configured to interface with external drive systems (e.g., gears 202c and 202d as depicted in FIGS. 22-23), which are configured to rotate the internal housing 104. In some embodiments, the gear teeth 126 are arranged circumferentially about the outer gear 124, however, alternative arrangements are considered. The teeth 126 may be involute, straight-cut, or of another known profile suitable for smooth torque transfer. In some embodiments, alternative gear styles or placements are used, provided they engage with the external drive systems to rotate the housing 104.

In some embodiments, the outer gear 124 also includes an internal lateral receiving feature 128, such as a shoulder, groove, or recessed surface. Receiving feature 128 is configured to receive and axially position a side cover 130. This feature extends along an internal radial surface of the outer gear 124 and is dimensioned to accommodate at least a portion of the side cover 130. The side cover 130 is configured to be secured to the internal housing 104 using for example fasteners 131 or any other devices or methods for connecting the side cover 130 to the housing 104, such as those described herein. When the side cover 130 is secured to the internal housing 104, the interconnection of the side cover 130 and the receiving feature 128 ensures proper axial alignment and retention of the outer gear 124 relative to internal housing 104. The side cover 130 is also intended to protect the internal components of device 100.

It should be noted that while the receiving feature 128 is circular in shape, alternative shapes are considered so long as the shape corresponds to the shape of the side cover 130 and aid in the relative alignment of the outer gear 124 and the internal housing 104. In addition, the side cover 130 includes a radial cutout 132 that is similarly sized to and aligns with the cutout 125.

Figure 5:
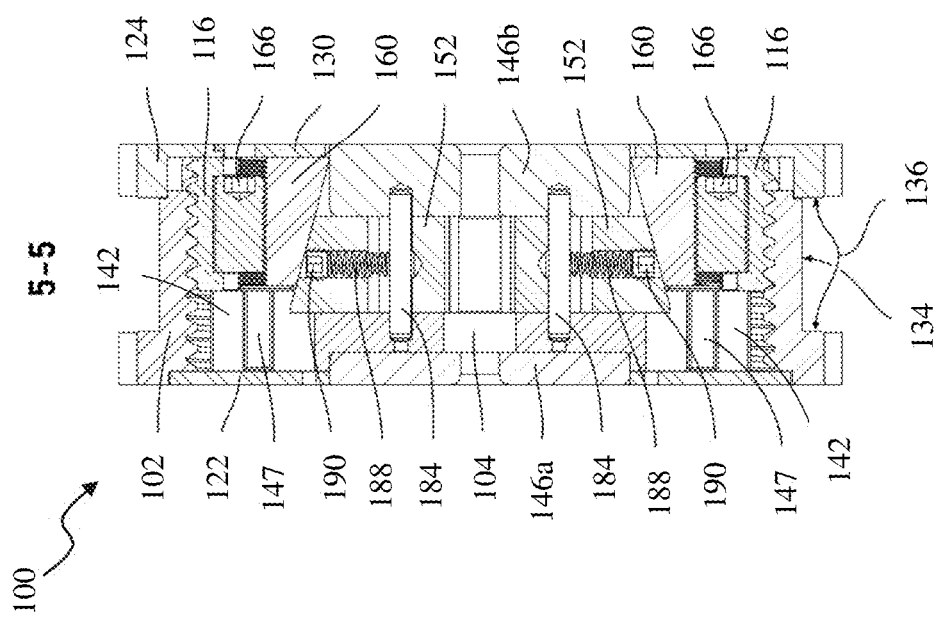
FIG. 5 is a cross-sectional view taken along line 5-5 in FIG. 4, showing internal components of the device in an unclamped state.
Figure 4:
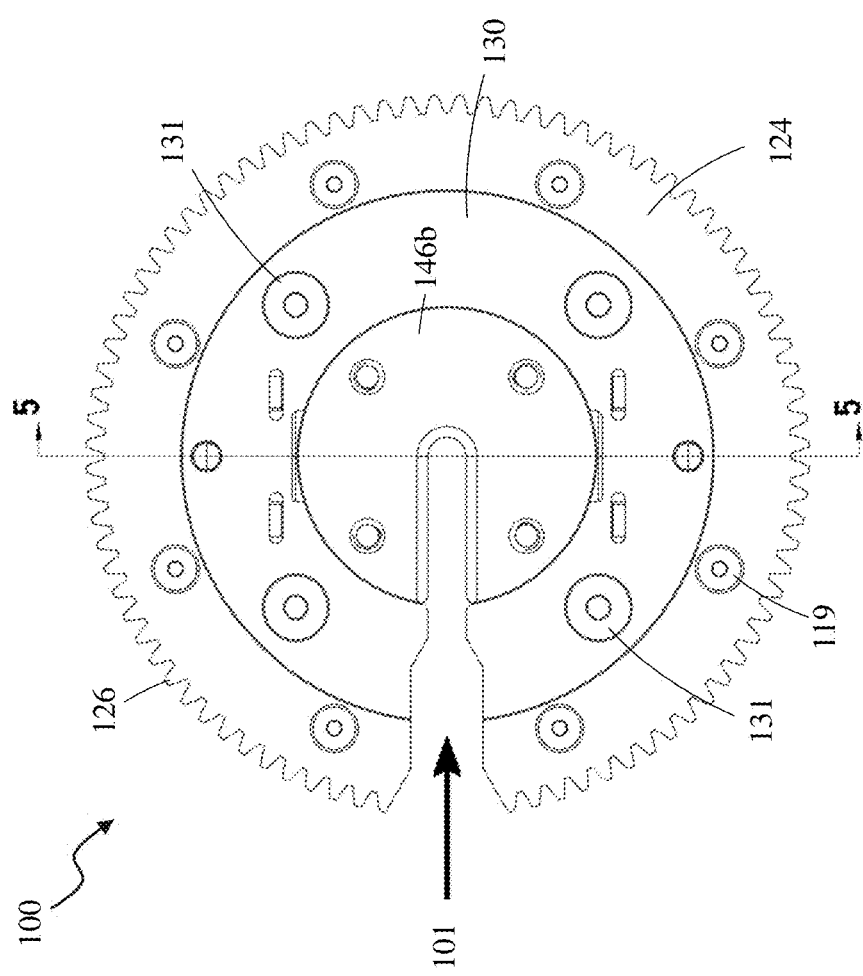
FIG. 4 is a side view of an embodiment of the present invention.

As best depicted in FIG. 5, the radial extension of gear teeth 114 and 126 establish retention surfaces 134 and 136. These surfaces are used to position device 100 in systems and/or machines for forming wire, tubes, or profiled rods of finite length by bending methods as exemplified in FIGS. 22-23. In some embodiments, the distance between surfaces 136 are between approximately 0.75 and 1.12 inches.

Referring now to FIGS. 5 and 8-10, the internal housing 104 includes a series of moveable components configured to secure the workpiece 108 in device 100. The internal housing 104 includes a discontinuous outer surface 138 about which the outer collar 102 can rotate. The discontinuity is established by a radial cutout 140 and one or more slider slots 142.

The cutout 140 establishes a passageway for feeding a workpiece 108 into the internal housing 104 of the device 100. As such, it has a similar size and shape to that of the other cutouts to allow passage of a workpiece 108.

Figure 10:
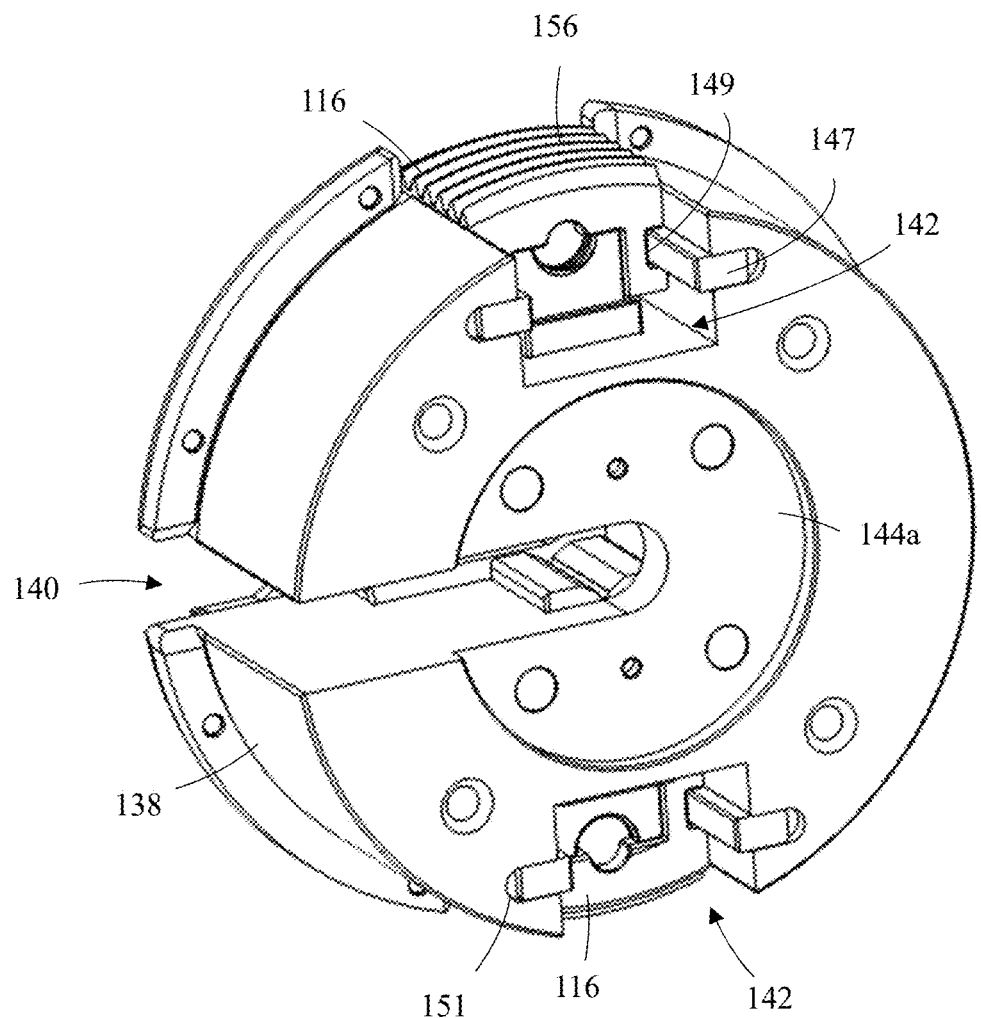
FIG. 10 is a perspective view of the internal housing in accordance with some embodiments of the present invention, which the sliders are depicted residing in the slider slots.

As previously noted, the housing 104 includes one or more slider slots. The slider slots 142 house the sliders 116 as illustrated in FIG. 10, and thus have a corresponding size and shape. However, the slider slots 142 may include an axial length (i.e., a length generally extending in a direction parallel to the central rotational axis of device 100) that is greater than the axial length of the sliders 116. As a result, the sliders 116 are capable of translating axially (see e.g., arrow 1002 in FIG. 21) relative to the slider slots 142, which allows the conversion of the rotational force on the collar 102 to the linear force on the sliders 116.

The depicted embodiment includes a pair of diametrically opposed slider slots 142. These slots 142 pass completely through the internal housing 104 in an axial direction and the side covers 122 and 130 function as end walls to contain the sliders 116 disposed within the slider slots 142 as best depicted in FIG. 5. In some embodiments, the slider slots 142 do not pass completely through the internal housing 104 and the end walls of the internal housing 104 contain the sliders 116 disposed within the slider slots 142.

Referring back to FIG. 10, the device 100 may include one or more guides 147 or key-like features configured to engage with corresponding slots or recesses 149 formed in the sliders 116. These guides 147 ensure that the sliders 116 move along a defined path, typically along a linear axis that is oriented in a parallel direction with respect to the longitudinal or rotational axis of the device, while preventing the sliders 116 from moving in a perpendicular direction with respect to the longitudinal or rotational axis of the device. The guides may be formed integrally with other components of the device 100 (e.g., the housing 104) or may be separate, discrete elements that are affixed or inserted into the device structure, such as receipts 151 in housing 104.

The guides also function to absorb the reaction forces when clamping a workpiece 108. More specifically, the clamping action results in the workpiece 108 producing a reaction force that is directed in a generally radial direction relative to the device 100. This reaction force is directed onto the clamping jaws 152 and in turn transfers onto the sliders 116. Each guide 147, in turn, absorbs approximately half of the reaction force applied to slider 116.

Figure 3:
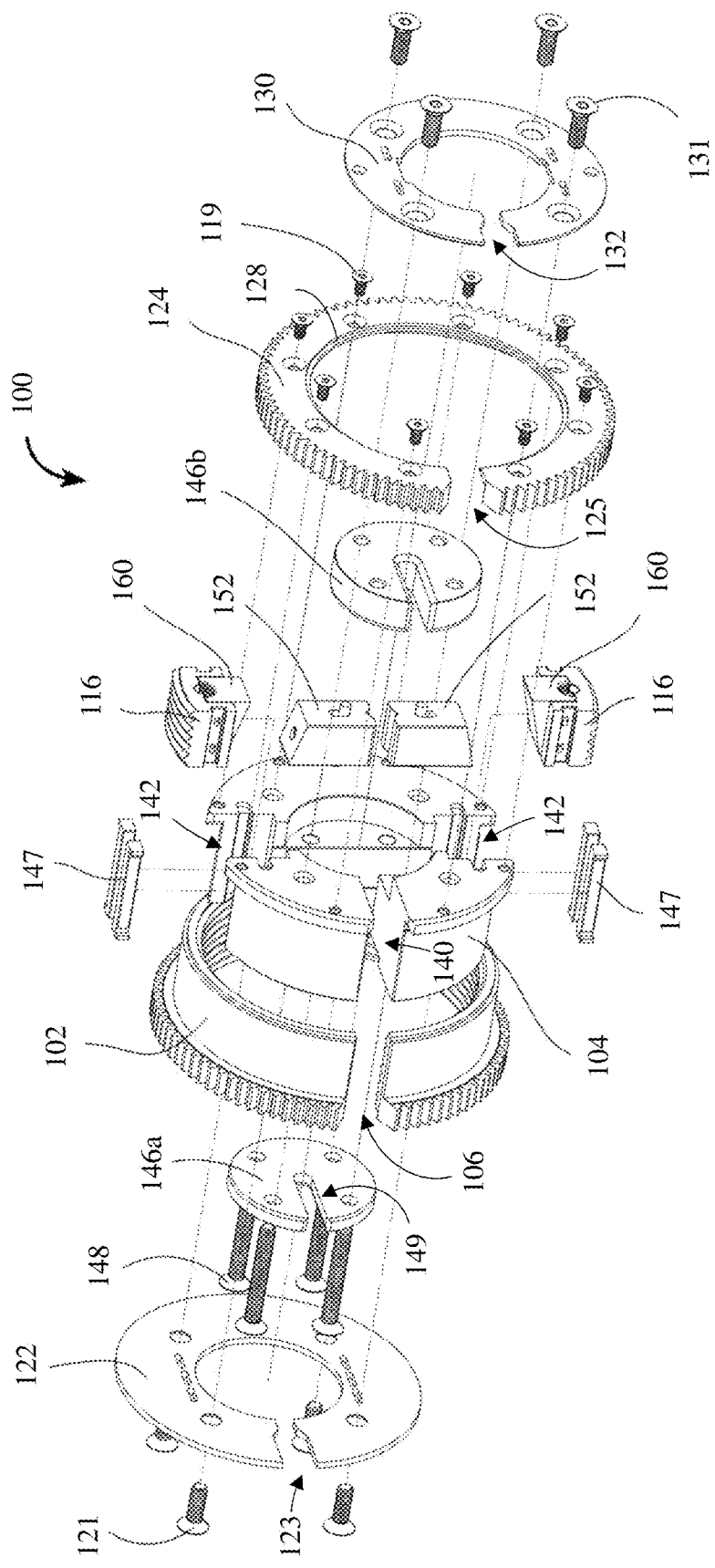
FIG. 3 is an exploded view of an embodiment of the present invention.

In some embodiments, as best exemplified in FIG. 3, the guides 147 comprise prismatic guide elements, such as elongated rails or blocks having a polygonal cross-section, that interface with complementary grooves 149 in the sliders 116 to ensure constrained linear translation without permitting rotation. These prismatic guides 147 may be interchangeable or removable components, allowing for modular assembly, wear replacement, or fine adjustment of the kinematic alignment of the sliders 116 within the device 100.

Figure 8:
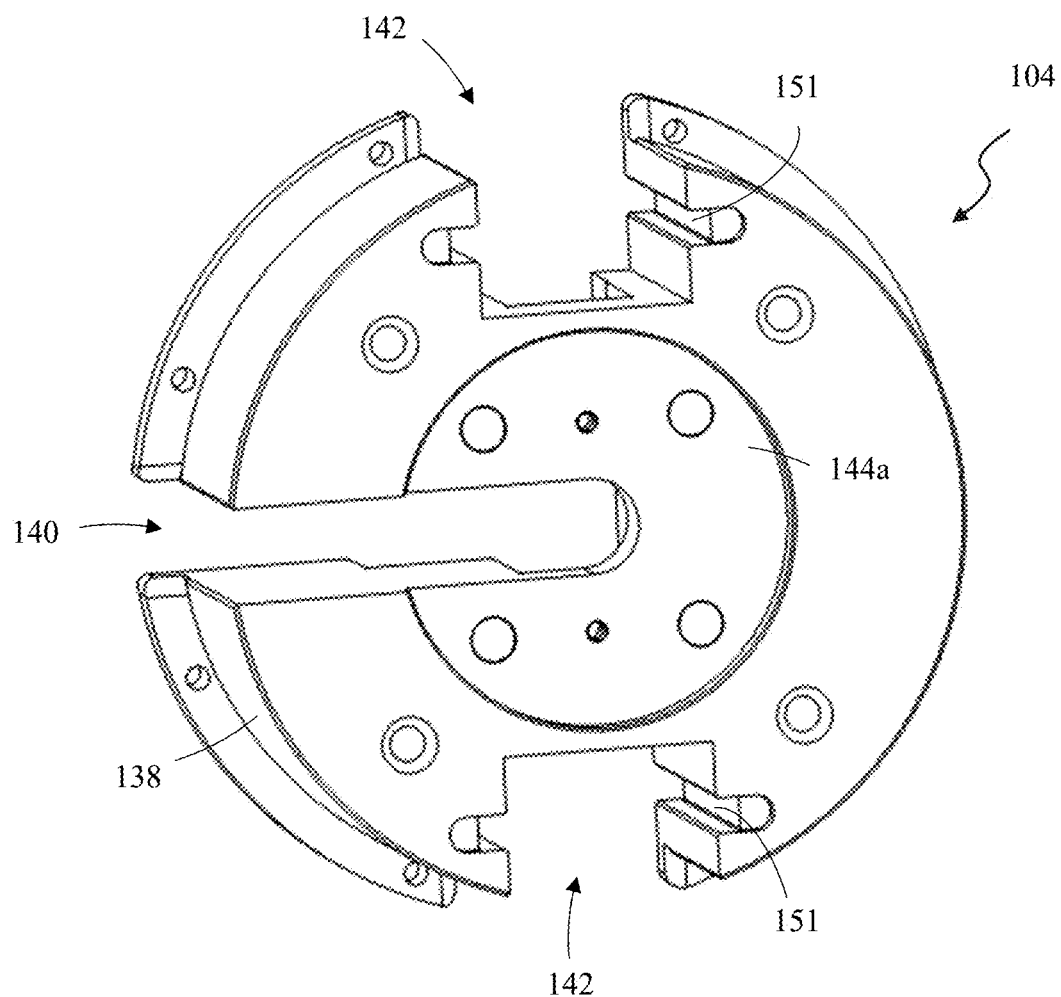
FIG. 8 is a perspective view of the internal housing in accordance with some embodiments of the present invention.
Figure 9:
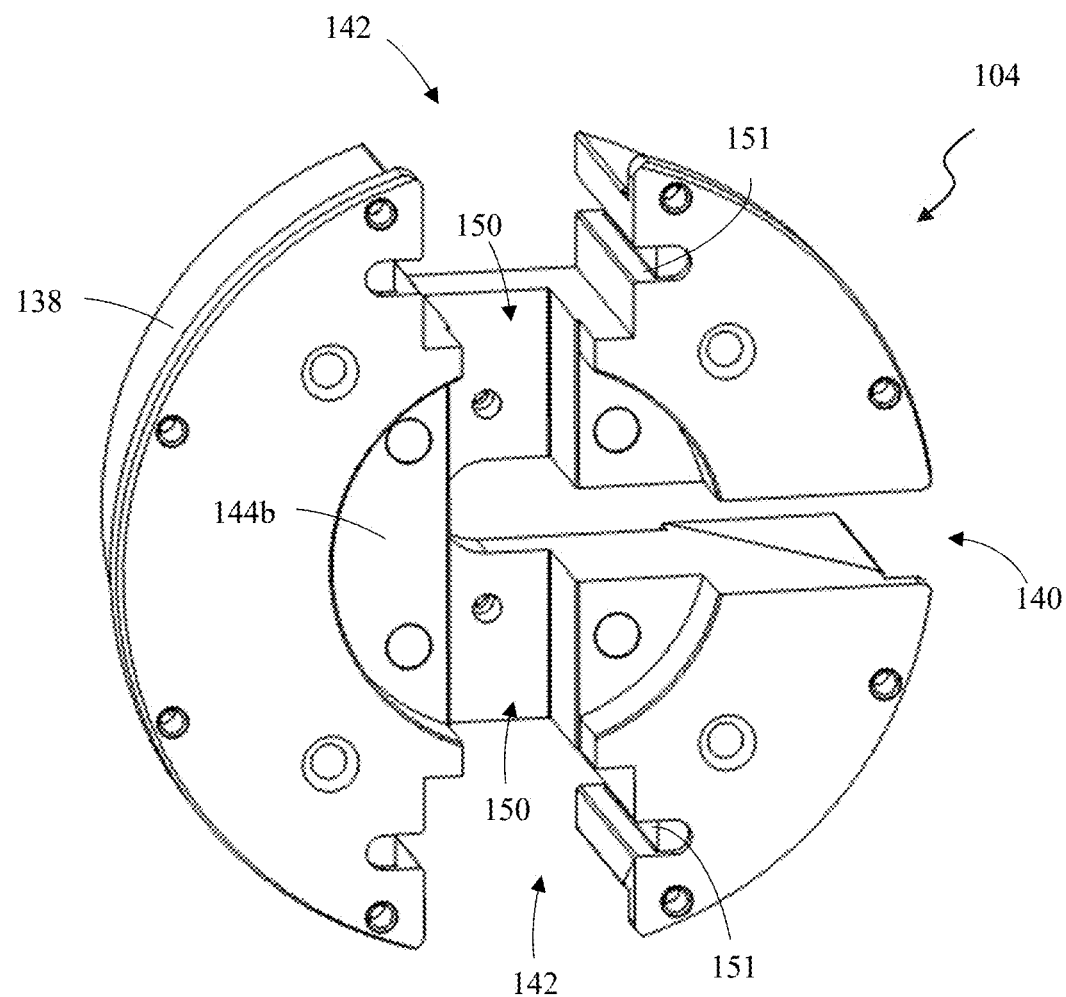
FIG. 9 is a perspective view of the internal housing in accordance with some embodiments of the present invention from a generally opposite side of the housing in comparison to FIG. 8.

Some embodiment of the internal housing 104 also includes pockets 144a and 144b as mostly clearly shown in FIGS. 8-10. Pockets 144 receive side discs 146a and 146b as depicted in FIG. 5. Thus, side discs 146 and pockets 144 have a corresponding shape and size. While both are depicted in a generally circular shape, alternative shapes are also considered.

These discs 146 serve as axial support structures for the workpiece 108 and help define clamping slots 150 through which the clamping jaws 152 operate. The side discs 146 are secured to the internal housing 104 using fasteners 148 that pass through apertures in the housing 104. Alternative attachment mechanisms, including but not limited to a threaded connection, snap-fit engagement, magnetic coupling, hook-and-loop material, a bayonet-style twist lock, or an adhesive bond may be employed in some embodiments.

The side discs 146 may include radial cutouts 149. Like the previously described cutouts, the cutouts 149 are sized to receive and support the workpiece 108 during processing. In addition, the side discs 146 may include a single or multiple cutouts 149 which can be aligned with the cutouts in the other components to allow for passage of the workpiece 108.

In some embodiments, the side disc 146 at least partially establish one or more clamping slots 150 for positioning of clamping jaws 152 within their corresponding slots 150. Each clamping slot 150 provides an open passageway between the cutout 140 and one of the slider slots 142, thereby allowing a corresponding clamping jaw 152 to translate towards the central rotational axis of the device 100. In some embodiments, each slot 150 may be generally linear and oriented in a radial direction. In some embodiments, the device 100 includes a pair of diametrically opposed clamping slots 150. As a result, a pair of jaws 152 can translate in the same radial plane between the opened and closed positions.

Referring now to FIGS. 10-13, the device 100 includes a slider for each slider slot 142. Some embodiments include a pair of sliders 116 with each one residing at least partially in one of the pair of slider slots 142. However, more or less sliders 116 may be used with more or less slider slots 142 to secure a workpiece 108 in device 100.

Sliders 116 serve as intermediary components that convert rotary motion into linear motion to actuate the jaws 152. Each slider 116 includes an outer radial surface 154. The outer radial surface 154 may be arcuate to a degree that generally matches that of the inner diameter of the outer collar 102. In addition, the outer radial surface 154 includes an engagement element 156. The engagement element 156 is configured to operably engage the internal actuation track 118 in the outer collar 102.

In some embodiments, the engagement element 156 is in the form of a helical engagement feature, such as a thread-like ridge, spline, or protrusion, that is configured to mate with a corresponding helical actuation track 118 formed on the inner surface of the outer collar 102. The engagement between the helical feature 156 on the slider 116 and the actuation track 118 converts rotational motion of the outer collar 102 into linear displacement of the slider 116 along an axis generally parallel to the longitudinal/rotational axis of the device 100.

In some embodiments, the helical engagement feature 156 may be integrally formed with the slider body, or it may be a discrete component, such as a wear-resistant insert, pin, or follower coupled to the slider 116. Moreover, while the exemplary figures depict the helical engagement feature 156 as a plurality of discontinuous thread-like or gear like features, the thread-like profile may be single-start, multi-start, partial, or continuous, depending on the desired mechanical response and load transfer requirements.

Figure 15:
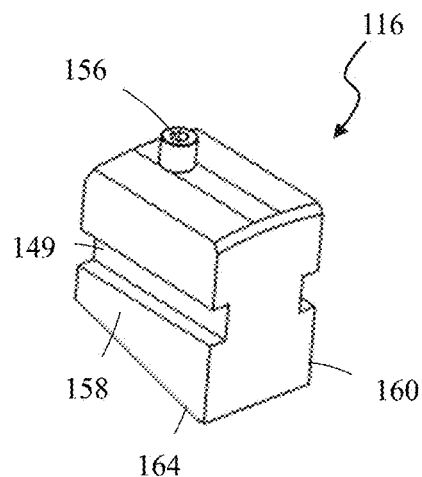
FIG. 15 is a perspective view of a slider in accordance with some embodiments of the present invention.

In some embodiments, the engagement element 156 is in the form of a projection as depicted in FIG. 15. The projection 156 extends into internal actuation track 118, which is in the form of a cam slot as depicted in FIG. 7. As the outer collar 102 is rotated relative to the internal housing 104, the internal actuation track 118 guides the projection 156 in an axial direction, which in turn moves the slider 116 in an axial direction.

As previously noted, the sliders 116 may also include guide slots or recesses 149 disposed in the lateral sidewalls 158 of the sliders 116. The guide slots 149 in conjunction with the guides 147 constrain the motion of the sliders 116 along a defined path, such as a linear axis that is oriented in a parallel direction with respect to the longitudinal or rotational axis of the device 100. It is also contemplated that the guides 147 may be integrated with or attached to the sliders 116 and the guide recesses 149 may be disposed in the slider slots 142.

The device 100 further includes one or more force transferring elements 160. Each of the force transferring elements 160 is configured to transfer the translation force of a slider 116 to one of the clamping jaws 152. Moreover, each force transferring element 160 is in operable communication with a slider 116, such that force transferring elements 160 translate in response to translation of the sliders 116. In some embodiments, the force-transferring element is a separate part coupled to the slider via a pin 162; in others, the function is integrated into the slider body.

Each force transferring element 160 may include a jaw contacting surface 164. The surface 164 may be wedge-shaped or have an alternative shape to cause a radial translation of the jaw 152 when the force transferring element 160 moves in an axial direction relative to device 100.

As depicted in FIG. 11-13, some embodiments of device 100 include an adjusting screw 166. The adjusting screw 166 includes a thread 168 configured to engage corresponding threads or grooves 170 on the force transferring element 160. In addition, the adjusting screw 166 resides within a pocket 172 in a slider 116, which retains the adjusting screw 166 while allowing rotation around its longitudinal axis. The internal housing 104 includes an access aperture 174 (see FIG. 1) permitting a user to engage and rotate the adjusting screw 166. Rotation of adjusting screw 166 around its own axis causes axial translation of the force transferring element 160, as shown in FIG. 13. The displacement occurs through the screw-nut connection established by the threads 168 of adjusting screw 166 engaging with a thread or grooves 170 on the force transferring element 160.

As previously noted, pins 162 may be used to interconnect the slider 116 with the force transferring element 160. In some embodiments, each pin 162 passes through one of the elongated apertures 163, which are disposed in the sidewalls of the slider 116, and corresponding apertures 165 in the sidewalls of the force transferring element 160. The elongated shape of aperture 163 relative to aperture 165 allow for translation of the force transferring element 160 relative to the slider 116. In addition, the endpoints of the elongated aperture 163 function as a limiter on the translation of the force transferring element 160 relative to the slider 116.

In some embodiments, the threaded engagement between the adjusting screw 166 and the force-transferring element 160 may also be configured as a non-backdrivable mechanism similar to a worm gear or the alternative non-limiting mechanisms described in relation to the collar-slider interface. For instance, the threads may have a shallow pitch or self-locking profile such that axial forces acting on the force-transferring element 160—whether from workpiece reaction loads or spring compression-do not result in rotation of the adjusting screw 166. This ensures that minute positional adjustments to the clamping jaws 152 remain stable under load, preserving centering accuracy and preventing loss of grip due to vibration or shifting during operation.

As depicted in FIG. 14, in some embodiments, the distance 'A' is predetermined such that the interface 165 between the adjusting screw 166 and the force-transferring element 160 results in the thread 168 of the screw 166 penetrates completely or to a predetermined depth within the threads or grooves 170 on the force transferring element 160. The predetermined depth fulfills the condition of self-locking or "screw locking" between the parts.

Rotation of the adjusting screw 166 allows for minute adjustments in clamping force and also allows a user to independently alter the radial location of each jaw 152 to account for non-symmetrical workpieces 108 or wear on the jaws 152. Moreover, the adjusting screw 166 provides precision centering accuracy and the capability to adjust the position of the longitudinal axis 109 of the workpiece 108 without disassembling the device 100 or replacing any parts of the device 100.

Figure 16:
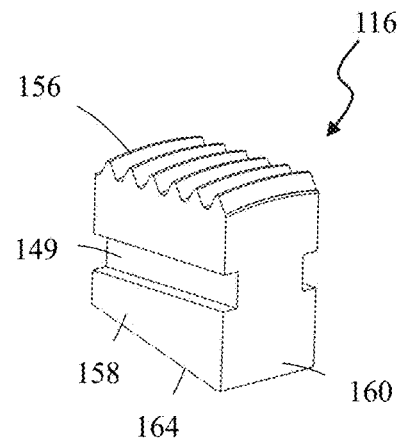
FIG. 16 is a perspective view of a slider in accordance with some embodiments of the present invention.
Figure 17:
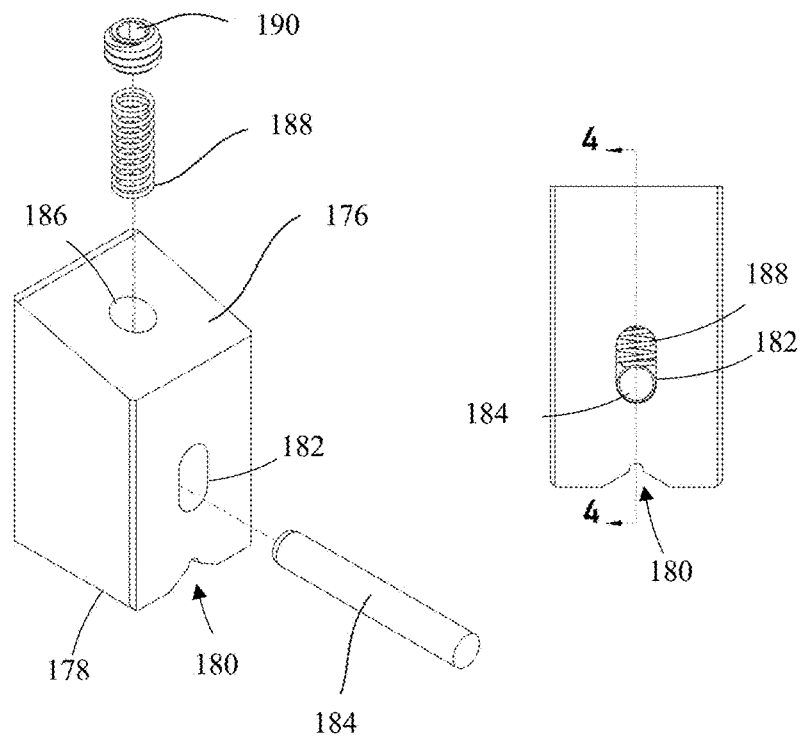
FIG. 17 is an exploded view of an embodiment of a clamping jaw in accordance with some embodiments of the present invention.
Figure 18:
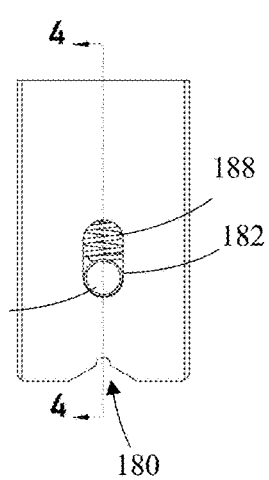
FIG. 18 is a front elevation view of an embodiment of a clamping jaw in accordance with some embodiments of the present invention.
Figure 19:
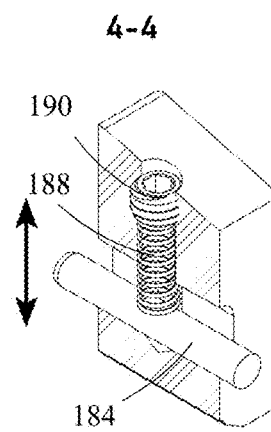
FIG. 19 is a cross-sectional view of the clamping jaw taken along line 4-4 in FIG. 18, showing internal components of a slider in accordance with some embodiments of the present invention.

In some embodiments, as depicted in FIGS. 15-16, the force transferring element 160 is integrated with slider 116, such that the bottom surface of the slider 116 function as the jaw contacting surface 164. Like other embodiments, the jaw contacting surface 164 can be wedge shaped or an alternative shape to cause a radial translation of the jaw 152 when the force transferring element 160 moves axially.

As previously explained, the clamping jaws 152 are configured to operably engage the jaw contacting surface 164, such that the axial translation of the slider 116 causes radial translation of the clamping jaw 152. In some embodiments, the clamping jaws 152 each include a first end 176 with a surface that is configured to operably engage the force transferring element 160. The surface may be an oppositely oriented wedge-shape with respect to the jaw contacting surface 164 as illustrated in FIG. 5. However, alternative surface shapes may be used to transfer of forces between the sliders 116 and the jaws 152.

A second end 178 of the jaws 152 is configured to engage the workpiece 108. As a result, the second end 178 may include receipt 180. The receipt 180 may be flat, rounded, arcuate, V-shaped, or some alternative shape to help retain a workpiece 108.

Some embodiments of the jaws 152 include an elongated aperture 182 for receiving a pin 184. The pin 184 also extends into apertures in the housing 104 and/or the sides discs 146 to secure the location of the pin relative to the housing 104. While the pin 184 remains fix relative to the housing, the elongated aperture 182 allows the jaws 152 to translate relative to the pin 184.

In such embodiments, jaws 152 also include a spring shaft 186 for receiving a return spring 188. The return spring 188 resides between a spring seat 190 and the pin 184 in a compressed state, such that a spring force is forcing jaws 152 towards sliders 116. In some embodiments, the spring seat 180 is a threaded plug, thereby allowing for easy installation and removal of the spring 188 as needed.

Figure 21:
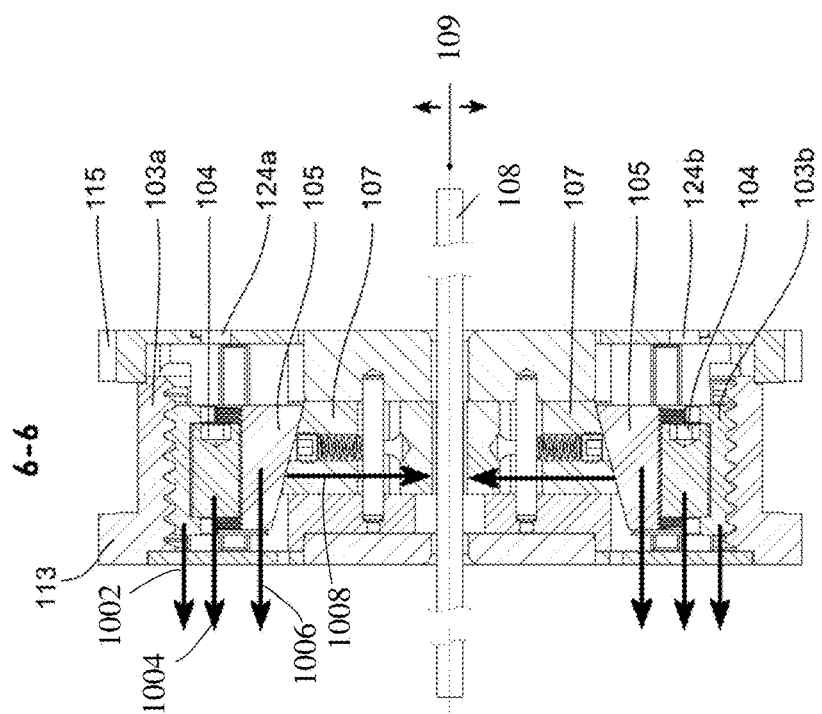
FIG. 21 is a cross-sectional view taken along line 6-6 in FIG. 20, showing internal components of the device in a clamped state.
Figure 20:
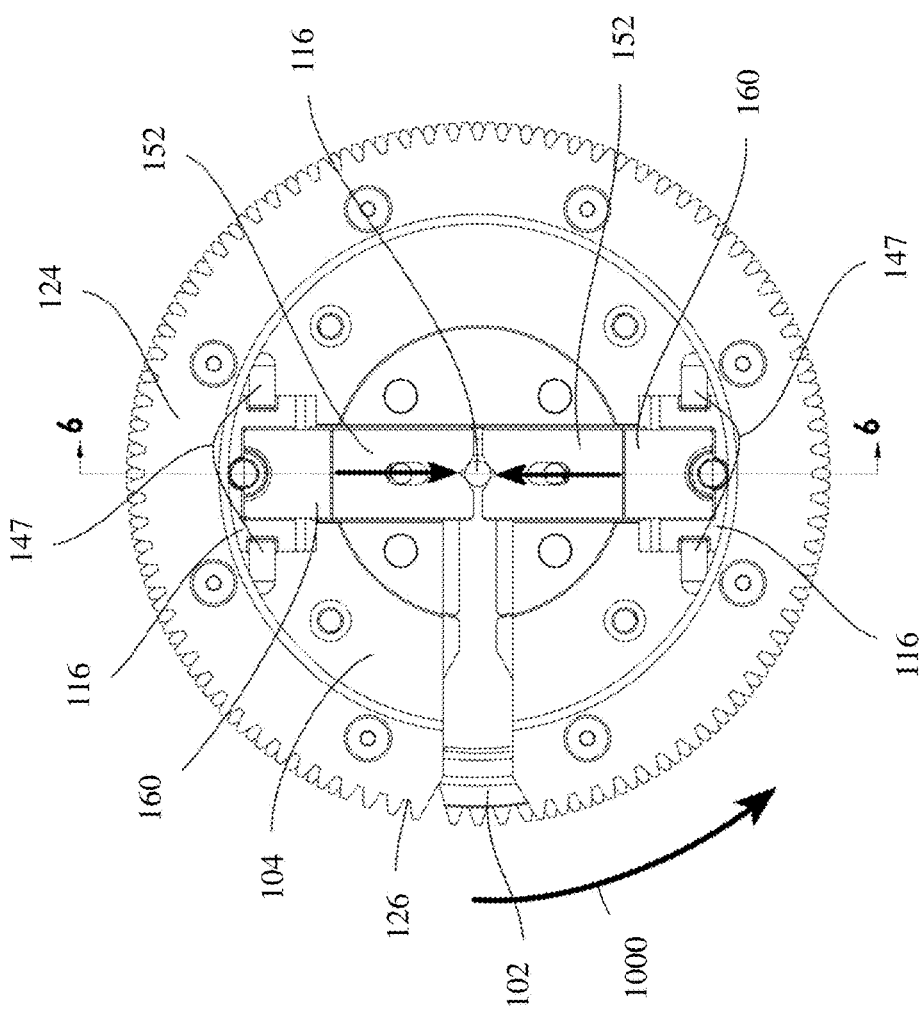
FIG. 20 is a side view of an embodiment of the present invention.

Referring now to FIGS. 20-22, the operation of the device 100, includes inserting a workpiece 108 through the aligned radial cutouts 106, 123, 125, and 132 of the outer collar 102, side covers 122 and 130, and outer gear 124, respectively, into the radial cutout 140 formed in the internal housing 104. This provides a clear lateral pathway into the clamping region of the device without requiring axial feeding of the workpiece. With the workpiece 108 in place, rotational torque is applied to the outer collar 102 via engagement of gear teeth 114 with external drive gears (e.g., gears 202a, 202b), while the internal housing 104 is held stationary by securing the outer gear 124 through engagement with gear teeth 126 and corresponding drive gears (e.g., gears 202c, 202d). As the collar 102 rotates relative to the housing 104, its internal actuation track 118—formed on the inner surface 112—interface with engagement elements 156, which project from each slider 116.

This interaction between actuation track 118 and engagement elements 156 converts rotational motion of the collar 102 (represented by arrow 1000) into axial linear displacement (represented by arrow 1002) of the sliders 116 within the slider slots 142. The axial translation of each slider 116 axially drives force-transferring element 160, either integrally formed or mechanically linked, relative to housing 104. Each force-transferring element 160 includes a jaw-contacting surface 164, which is typically wedge-shaped or similarly contoured to produce radial movement of an associated clamping jaw 152. As the element 160 moves axially as represented by arrow 1006, it engages the first end 176 of the clamping jaw 152, causing the jaw to translate radially inward along the clamping slot 150 as represented by arrow 1008. The second end 178 of each jaw 152 then presses firmly against the outer surface of the workpiece 108, thereby securely gripping and centering it within the device.

For precision adjustments, the device 100 includes one or more adjusting screws 166 retained within pockets 172 formed in the sliders 116. Each adjusting screw 166 includes external threads 168 that engage internal grooves or threads 170 in the corresponding force-transferring element 160. A user may access each adjusting screw 166 through an access aperture 174 in the internal housing 104 and, by rotating the screw about its longitudinal axis, produce fine axial displacement of the force-transferring element 160 relative to the slider 116 as represented by arrow 1004. This allows minute adjustments to the radial position of the clamping jaws 152, enabling compensation for workpiece asymmetry, jaw wear, or manufacturing tolerances without disassembling the device or replacing parts.

As depicted in FIG. 22, during use, the centering clamping device 100 may be installed by surface 134, for example, into a bushing 201 in systems and/or machines used for bending wire, tubes, or profiled rods of finite length. As previously mentioned, the centering and clamping of the workpiece 108 occurs due to rotation of the outer collar 102 relative to the housing 104 as represented by arrow 1000. One possible way to achieve the required conditions is by transferring rotational torque from the power drive to the gear of the outer collar 102 via a set of gears 203a, 202a, 202b, in the direction shown in the drawing (see e.g., rotational arrows 1000, 2002, and 2003). Simultaneously, the holding torque from the power drive is transmitted to the housing 104 using gear 124 through a set of gears 203b, 202c, 202d. Subsequently, during processing of the workpiece, gears 203a and 203b move synchronously in each direction. Gear sets 202a, 202b on one side and 202c, 202d on the other side enable unlimited rotation of the workpiece 108 around its longitudinal axis 109.

Upon completion of the processing cycle, which is exemplified in FIG. 23, the produced part 301 must be extracted in a direction perpendicular to the longitudinal axis of the workpiece through cut-out 101. This is achieved by transmitting holding torque from the power drive to the housing 104 via gear 124 through gear set 203b, 202c, 202d on one side, and simultaneously transmitting rotational torque from the power drive to the gear 114 of the outer collar 102 as represented by arrows 1000, 2002, and 2003 via gear set 203a, 202a, 202b on the other side. When the outer collar 102 rotates in the direction indicated on the drawing, the clamping jaws 152 return to their initial positions, thus releasing the finished part 301.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A device for gripping and centering a workpiece, comprising:
   an internal housing defining a radial cutout configured to receive a workpiece and a slider slot;
   an outer collar rotatably mounted around the internal housing, the outer collar including a radial cutout aligned with the radial cutout of the internal housing;
   a slider positioned within the slider slot, the slider configured to engage the actuation track, such that rotation of the outer collar relative to the internal housing causes axial translation of the slider;
   a clamping jaw movably positioned in a clamping slot in the internal housing, the clamping jaw having a workpiece-engaging surface at a first end and a force-receiving surface at a second end and a return spring disposed between a spring seat and a fixed support to bias the clamping jaw towards the slider; and
   wherein the slider is in operable communication with the clamping jaw, such that axial translation of the slider in a first direction radially displaces the clamping jaw towards the workpiece when the workpiece resides within the radial cutout in the internal housing.

2. The device of claim 1, wherein the outer collar includes an actuation track on an inner surface, and the slider includes an engagement element configured to engage the actuation track to produce the axial translation of the slider in response to rotation of the outer collar.

3. The device of claim 1, wherein the outer collar includes gear teeth on an outer surface configured to engage a drive gear to rotate the outer collar relative to the internal housing.

4. The device of claim 1, further comprising an outer gear secured to the internal housing, the outer gear including gear teeth configured to receive torque from a separate drive system to control rotation of the internal housing during operation.

5. The device of claim 1, wherein the internal housing includes one or more guides configured to constrain motion of the slider along a linear axis.

6. The device of claim 1, wherein the slider and the outer collar include mating helical engagement features configured to prevent reverse rotation of the outer collar in response to axial force applied to the slider, thereby forming a self-locking interface that maintains clamping position without continuous external torque.

7. A device for gripping and centering a workpiece, comprising:
an internal housing defining a radial cutout configured to receive a workpiece and a pair of diametrically opposed slider slots;
an outer collar rotatably mounted around the internal housing, the outer collar including a radial cutout and a helical actuation track formed on an inner surface of the outer collar;
a pair sliders, each slider positioned within a corresponding slider slot and including an engagement element configured to engage the helical actuation track, such that rotation of the outer collar relative to the internal housing causes axial translation of the sliders;
a pair of diametrically opposed clamping jaws, each clamping jaw movably positioned in a clamping slot in the internal housing and having a workpiece-engaging surface at a first end and a force-receiving surface at a second end;
an adjusting screw disposed within each slider and threadedly engaged with a force-transferring element configured to adjust the position of the corresponding clamping jaw;
wherein each slider is in operable communication with a corresponding clamping jaw, and axial translation of the sliders in a first direction radially displaces the clamping jaws toward each other.

8. The device of claim 7, wherein the engagement elements of the sliders are thread-shaped ridges or projections configured to track within the helical actuation track on the inner surface of the outer collar.

9. The device of claim 7, wherein the helical actuation track and engagement elements form a self-locking interface that resists reverse rotation of the outer collar in response to axial force applied to the sliders.

10. The device of claim 7, wherein each clamping jaw includes a return spring disposed between a spring seat and a fixed support to bias the clamping jaw towards the corresponding slider.

11. The device of claim 7, wherein the outer collar includes gear teeth on an outer surface configured to engage a drive gear to rotate the outer collar relative to the internal housing.

12. The device of claim 7, further comprising an outer gear secured to the internal housing, the outer gear including gear teeth configured to receive torque from a separate drive system to control rotation of the internal housing during operation.

13. The device of claim 7, wherein the internal housing includes one or more guides configured to constrain motion of the sliders along a linear axis.

14. A method of gripping and centering a workpiece, comprising:
inserting the workpiece laterally into a radial cutout defined in an internal housing of a clamping device;
rotating an outer collar mounted around the internal housing, the outer collar having a radial cutout aligned with the radial cutout of the internal housing and an inner surface defining a helical actuation track;
wherein rotation of the outer collar causes axial translation of a pair of diametrically opposed sliders engaged with the actuation track;
wherein axial translation of the sliders causes radial displacement of a pair of diametrically opposed clamping jaws;
wherein an adjusting screw is disposed within each slider and is threadedly engaged with a force-transferring element such that rotation of the adjusting screw alters the position of a corresponding clamping jaw; and
wherein the radial displacement of the clamping jaws grips the workpiece within the radial cutout of the internal housing.

15. The method of claim 14, wherein the actuation track and slider engagement elements form a self-locking interface that prevents reverse rotation of the outer collar in response to forces acting on the clamping jaws.

16. The method of claim 14, further comprising rotating an adjusting screw disposed in one of the sliders to axially position a force-transferring element coupled to a particular clamping jaw thereby altering a radial location of the particular clamping jaw.

17. The method of claim 14, further comprising applying torque to an outer gear secured to the internal housing to control rotation of the internal housing during processing.

18. The method of claim 14, further comprising rotating the outer collar in a direction opposite the gripping rotation to release the clamping jaws and permit removal of the workpiece.

* * * * *